United States Patent
Cruickshank

[11] Patent Number: 5,408,325
[45] Date of Patent: Apr. 18, 1995

[54] APPARATUS FOR MEASURING THE PROFILE OF A MOVING OBJECT

[75] Inventor: John S. Cruickshank, Inchture, Scotland

[73] Assignee: Cruickshank Partners, Scotland

[21] Appl. No.: 146,124

[22] PCT Filed: May 13, 1992

[86] PCT No.: PCT/GB92/00860
§ 371 Date: Nov. 12, 1993
§ 102(e) Date: Nov. 12, 1993

[87] PCT Pub. No.: WO92/20995
PCT Pub. Date: Nov. 26, 1992

[30] Foreign Application Priority Data

May 16, 1991 [GB] United Kingdom ............. 9110570

[51] Int. Cl.[6] .......................................... G01B 11/24
[52] U.S. Cl. ............................ 356/376; 356/385; 250/560
[58] Field of Search ............. 356/376, 383, 384, 385, 356/386, 387, 394; 250/560

[56] References Cited

U.S. PATENT DOCUMENTS

| | | |
|---|---|---|
| 3,737,856 | 6/1973 | Lehrer et al. |
| 3,956,629 | 5/1976 | Gomm et al. |
| 4,192,613 | 3/1980 | Hammar ............. 356/386 |
| 4,500,203 | 2/1985 | Bieringer ............. 356/240 |
| 4,652,133 | 3/1987 | Antoszewski et al. ..... 356/376 |
| 5,015,867 | 5/1991 | Siegel et al. ............ 356/386 |

FOREIGN PATENT DOCUMENTS

| | | |
|---|---|---|
| 56-117107 | 9/1981 | Japan . |
| 60-178304 | 9/1985 | Japan . |
| 261103 | 10/1988 | Japan ............. 356/376 |
| 2030286 | 4/1980 | United Kingdom . |

OTHER PUBLICATIONS

Patent Abstracts of Japan, vol. 10, No. 26 (P-425) (2083), 31 Jan. 1986.
Patent Abstracts of Japan, vol. 5, No. 191 (P-92) (863), 5 Dec. 1981.

Primary Examiner—F. L. Evans
Attorney, Agent, or Firm—Ladas & Parry

[57] ABSTRACT

An apparatus for measuring the profile of a moving object has a cassette housing (161) having an aperture (31) for the passage of the object. At least two spaced light emitters (41, 47) and associated light detectors (42, 48) are positioned so that the light detectors and light emitters are spaced on opposing sides of the object such that a particular profile of the object may be measured. The light detector is, preferably, a linear array of elements. Means are provided for producing a warning if the profile is outside a predetermined tolerance.

15 Claims, 4 Drawing Sheets

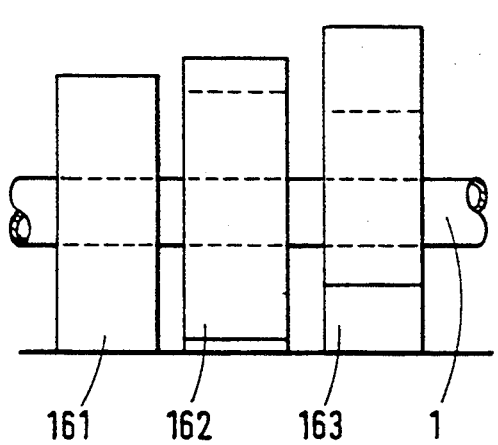
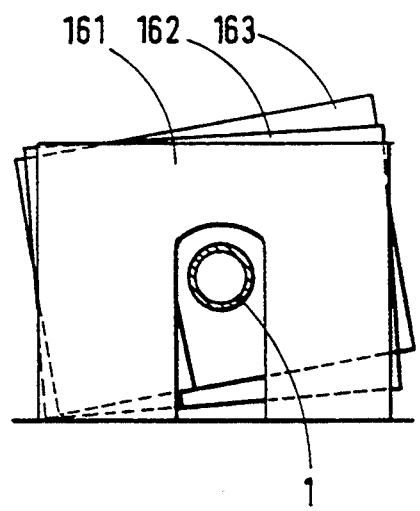
Fig.3(a)　　　　Fig.3(b)
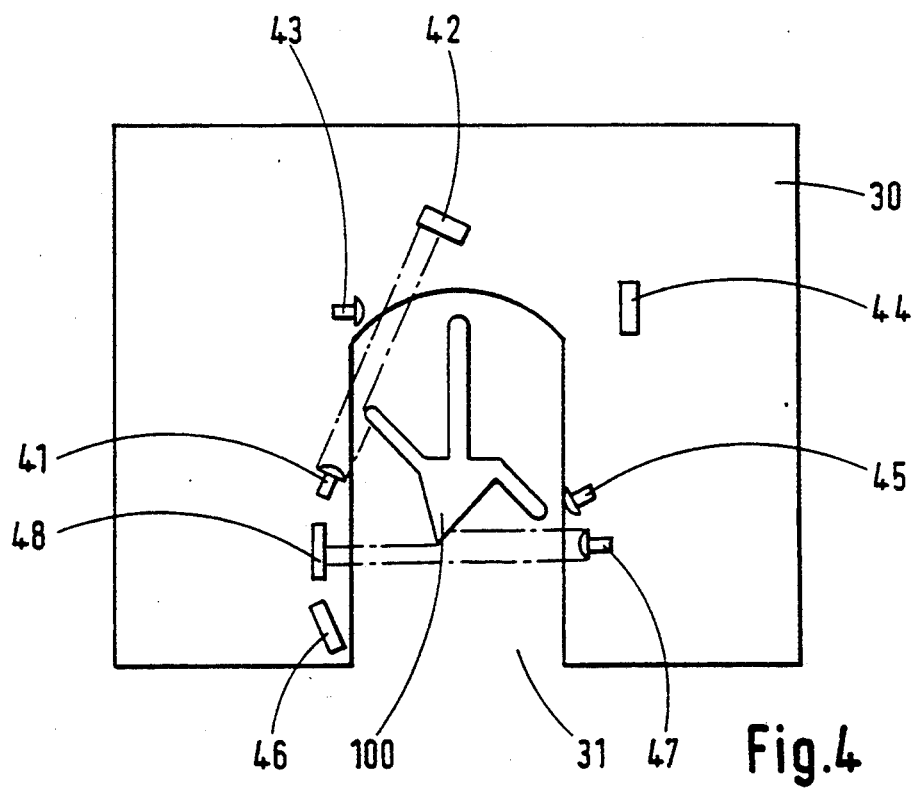
Fig.4

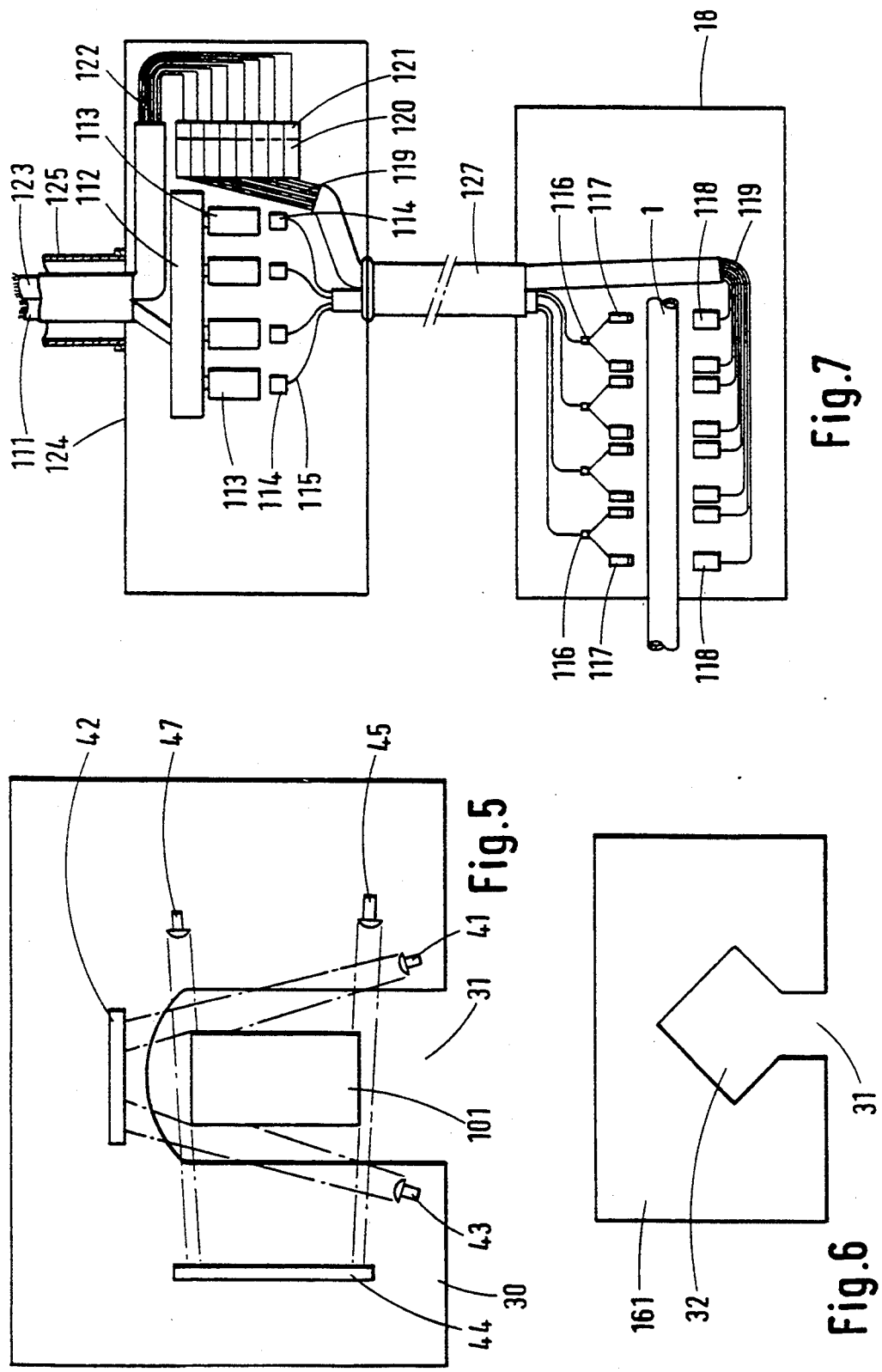

APPARATUS FOR MEASURING THE PROFILE OF A MOVING OBJECT

BACKGROUND OF THE INVENTION a. Field of the Invention

This invention relates to an apparatus for measuring the profile of a moving object. Once the profile of the object has been measured it may be compared against predetermined dimensions, for example to determine whether or not the object has been damaged. The invention is particularly, although not exclusively, used for determining the profile of coiled tubing used in the oil and gas industry, but may also be used for measuring the profile of extruded objects made by a continuous process, or objects in automated transfer lines, or hawser or cable during lifting.

b. Description of the Related Art

A known apparatus for measuring the profile of an object is disclosed in U.S. Pat. No. 4,800,104. It is known to check the internal profile of a tubular member by optically scanning the entire 360° of the surface with a light beam and to receive reflected energy which may be transmitted to electrical energy to provide a trace on a C.R.T. which may then be compared with a predetermined trace. Such an apparatus is mechanically complex and has electronic components requiring electrical power at the measurement station. In an oil and gas well drilling situation a so-called zone 1 permits electrical power, whereas a so-called zone 0 must have no electrical activity to avoid explosions and such a zone 0 station is at the top of a well head.

The present invention seeks to provide an apparatus for measuring the profile of a moving object suitable for use in a zone 0 situation.

SUMMARY OF THE INVENTION

According to this invention there is provided an apparatus for measuring the profile of a moving object comprising at least two spaced light emitting means and light receiving means for receiving illumination therefrom, the light emitting means being positioned on one side of a passage through which said object is movable and the light receiving means being positioned on another portion of said passage so that a particular profile of the object may be measured and the positioning of the light emitting means and light receiving means being such that the object partially cuts the light received by the light receiving means, processing means connected to the light receiving means for measuring the profile of said object from one of the illuminated portions of the light receiving means and the non-illuminated portion thereof, characterized by said light emitting means including light projecting means disposed at least partially around said passage and positioned to emit light beams along different angularly directed paths, said light receiving means also being disposed at least partially around said passage, said light projecting means and said light receiving means being located in a cassette housing, said cassette housing having an aperture defining said passage, and means for pressurizing said housing.

Preferably said pressurizing means is a gas pressure means connected to said housing for increasing the internal pressure thereof above atmospheric pressure, and a gas pressure detector is provided for detecting said housing internal pressure and in dependence upon said housing internal pressure being adapted to cut off electrical power to said apparatus.

Preferably, each light emitting means is a light emitting diode or laser diode and said light receiving means is a linear array of elements having a pitch of less than 0.00254 mm. Conveniently, the processing means includes a comparator for comparing the measured profile with a predetermined set of profile values and for producing a signal representative of the difference therebetween.

Advantageously, the light output from the light emitting means is collimated by a lens, or a line optic lens provided to produce parallel light rays. Alternatively, the light emitting means include light source means and collimating means remotely positioned therefrom, a fibre optic cable linking said light source means and said collimating means so that only optical components are located in said housing, and an opto-electric electric converter is provided for providing signals to said processing means, which converter is located at a predetermined safe distance from the object.

In one embodiment the light emitting means, light detecting means and processing means are located on a printed circuit board in said housing.

Conveniently, an opening extends from a side wall of the housing to said aperture, said opening having sufficient width to permit said housing to locate about said object.

Advantageously, a plurality of housings are provided about said object, each housing being differently angularly positioned so that different profiles of said object may be measured.

In a preferred embodiment, manually resetable means are provided for setting a predetermined tolerance for the measured profile.

Advantageously, means is provided for activating warning means such as an audible alarm or a visual alarm if said predetermined tolerance is exceeded.

BRIEF DESCRIPTION OF THE DRAWINGS

The invention will now be described, by way of example, with reference to the accompanying drawings in which:

FIG. 6 shows a preferred form of a cassette for housing the apparatus in accordance with this invention, FIG. 7 shows a feature of this invention for converting optical energy to electrical energy.

In the Figures like reference numerals denote like parts.

DESCRIPTION OF THE PREFERRED EMBODIMENTS

Figure 1:
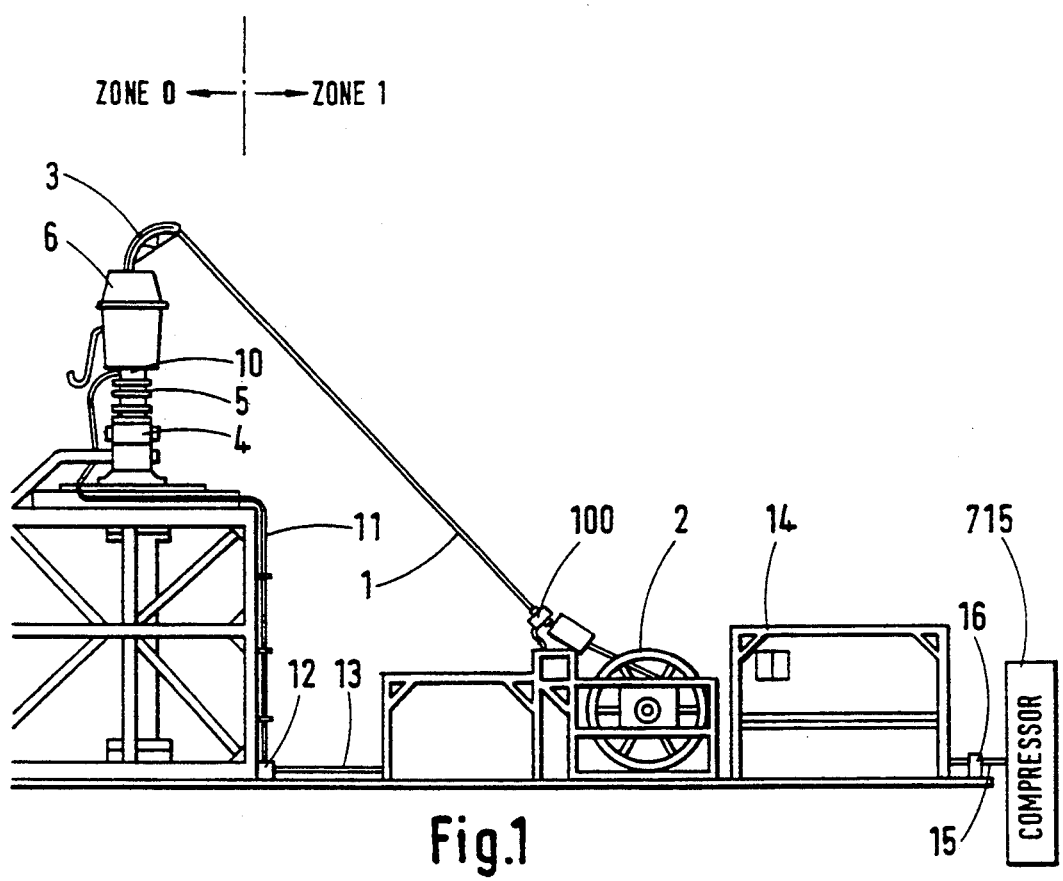
FIG. 1 shows the environment in which the subject invention is used.

The present invention will be particularly described with reference to measuring the profile of coiled tubing. Such tubing is steel tube between 2.54 cm and 6.35 cm (one inch and two and a half inches) outer diameter, the tubing being joined by welding to form a continuous length of tube up to 9,144 m (30,000 feet) long. The tubing 1 is wound onto a spool 2. The tubing is driven by a winch (not shown) via a goose neck 3 downhole. At the top of the well head is a Christmas tree 4, a blowout preventer 5 and injectors 6. The tube is pushed into and pulled out of the hole at a rate of about 61 m (200 feet) per minute and with a force of up to 6,800 Kg (15,000 pounds) force. It will be realised that with such rate of movement and force and because the tubing is run into and out of a hole many times so the tubing tends to become deformed. Since the tubing may be used to carry water, acid or gas at pressures up to 5,000 psi, as well as being used to place valves, instruments, downhole motors, etc., a major problem is in monitoring the tube for damage, weakness or wear. An apparatus 10 in accordance with this invention is positioned between the injectors 6 and blowout preventers 5 which measures the profile of the tubing, and because the apparatus is located in a zone 0 area where there must be no electrical activity, information concerning the profile is transmitted via fibre optic cable 11 to an opto-electrical energy converter 12 located in a zone 1 area. The converter 12 is pressurized above atmospheric pressure by air carried in tubing 13. The tubing 13 also carries power and signal wires to the converter. The tubing 13 runs to a control and read-out display unit located in a control cabin 14.

Located adjacent to the spool 2 is a further apparatus 100 in accordance with this invention, but since the apparatus 100 is in a zone 1 area, so the housing containing the apparatus also contains the converter for converting optical energy to electrical energy. The housing or cassette is also pressurized to be above atmospheric pressure to prevent the ingress of gas carrying atmosphere. The pressurized tubes are all monitored so that if the pressure should drop indicating damage to the tubing, which in turn could indicate damage to the electrical components, so all electrical power is cut off. The inlet air pressure from compressor 715 is admitted via tube 15 and the pressure detector and electrical cut off switch is denoted by numeral 16. The air that is supplied via tube 15 is clean filtered air.

An embodiment of the apparatus in accordance with this invention will now be described with reference to FIG. 2.

The profile of the tubing being inspected is checked for belling, thinning, kinking or ovality while running at speeds of up to 61 m (200 feet) per minute. To determine the diameter of the tubing, in theory, only two pairs of light emitters and light detectors are required arranged so that there are two spaced light emitters disposed on the opposite sides of the tubing from the light detectors. However, it will be readily appreciated that the greater the number the pairs of light emitters and light detectors arranged so that a greater number of diameters of the tube are measured, the greater will be the accuracy in determining the profile of the tubing. Although only six pairs of light emitters and detectors are shown in FIG. 2, it is preferred that eight or more pairs of detectors be employed.

A printed circuit board 30 has an opening 31 extending from one side of the printed circuit board to permit the tubing 1 to pass substantially perpendicularly to the major surfaces of the printed circuit board 30 and so that the printed circuit board 30 may be located about the tubing 1 in situ. Grouped around the opening 31 are pairs of light emitting elements, such as LEDs 41, 43, 45, 47, 49, 51 and respective linear light detecting elements, such as a linear array of pixels 42, 44, 46, 48, 50, 52, positioned on opposite sides of the tube 1 from the associated light emitters. The length of the linear array may be varied in accordance with the size and shape of the object being measured but, with coiled tubing, an array about 1000 pixels has proved satisfactory. Disposed in front of each of the light emitters is a means to produce a parallel light beam such as a line optic lens or, preferably, a collimating lens 61, 63, 65, 67, 69, 71. Each pair of light emitters and light detectors is arranged so that light emitted is partially cut by the tube 1 so that only some of the pixels of the light detectors are energized. Preferably, the pixels have a pitch of less than 0.00254 mm. Either the picture elements that are activated or those that are not activated may be used to determine the location and diameter of the tube 1. By combining the outputs of detectors on diameters of the tubing, so the precise diameter of the tube may be measured. If the tube is perfectly circular, four circumferential points of the tube at 90° to each other will be represented by the activated or non-activated picture elements. If the tube should move slightly, with respect to the picture elements, the total of the active or non-active elements in diammetric pairs of light detectors will be the same as if the tube was perfectly central between the detectors. That is the number of elements that are non illuminated in one array will be illuminated in the diammetrically opposite array. The tube prevents the illumination of all the picture elements in the detector and the picture elements not activated by the illumination (or conversely those that are activated) are used to provide the point position within a known spatial area by combining the number of inactive elements (or active elements) from pairs of arrays.

Figure 2:
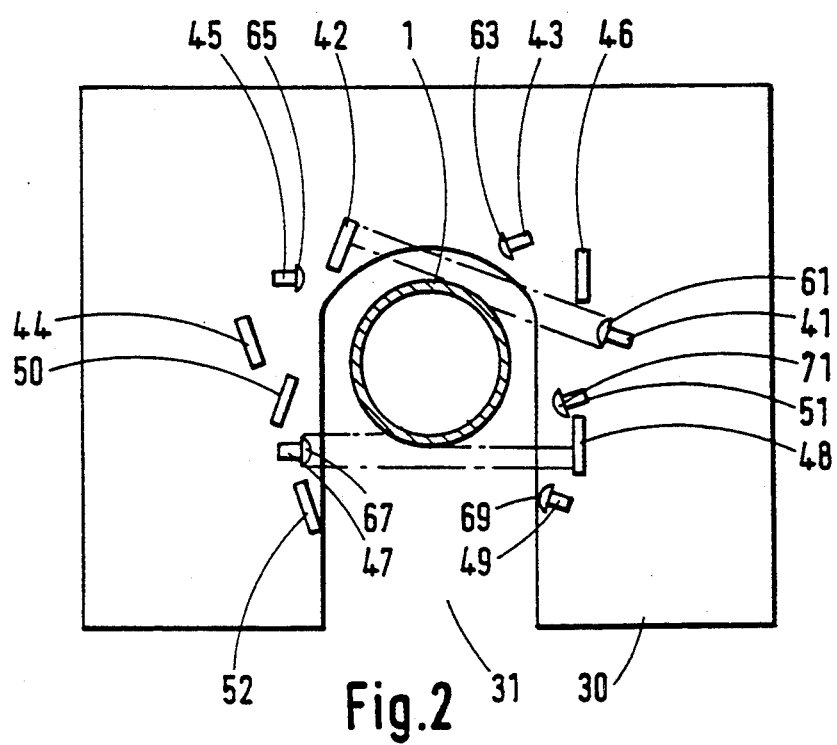
FIG. 2 shows in schematic form a plan view of one embodiment of an apparatus in accordance with this invention, FIGS. 3 (a) and 3 (b) show mutually orthogonal views of an array of apparatus, each in accordance with this invention, disposed about a tube, FIGS. 4 and 5 each show plan views of further embodiments of the invention for measuring differently shaped objects.

Although only one side of the printed circuit board 30 is shown in FIG. 2, pairs of light emitters and light detectors having different angular relationships may be mounted on the opposing side of the board to increase the number of profile points of the tube to be inspected, measured or compared.

The printed circuit board 30 is preferably located inside an air pressurized cassette 161, shown in FIG. 6. The preferred shape of the opening 31 is as shown in FIG. 6 and opposed pairs of light emitters and photodetectors are arranged on opposing sides of a square-shaped opening 32.

As shown in FIGS. 3(a) and 3(b), three or more cassettes 161 may each be differently angularly disposed about the tube 1, there being a difference of, say, 10° between the inclination of each of the cassettes. Thus, cassette 161 is positioned to be horizontally disposed about the tube, cassette 162 is inclined at an angle of 10° and cassette 163 is inclined at an angle of 20° with respect to the horizontal. Such a formation allows numerous circumferential points of diameter to be inspected. The tube is normally run between supporting bushes on each side of the cassette, the bushes not being shown for clarity. The opening 31 in the cassetts enables the cassettes to be replaced without having to feed the cassetts along a long length of tube.

The foregoing relates to a circularly cross-sectioned object, but the present invention is also applicable to the inspection, comparison or measurement of virtually any shaped object which is to be continuously viewed. The positioning of the light emitters and light detectors on the printed circuit board are, thus, varied in dependence upon the cross-sectional shape of the profile to be inspected, measured or compared. Thus, an irregular shape 100 or a rectangular shape 101 may be determined by appropriate location of the light emitters and detectors, as shown in FIGS. 4 and 5. It will, however, be noted that in the arrangement of FIG. 5 where a rectangular cross-sectional profile is to be viewed, light emitters 4 and 43 are both directed towards a common linear array 42 and, similarly, emitters 47 and 45 are directed towards a common array 44. Although in the FIG. 5 arrangement the photodetectors are unable to directly provide dimensional information if the object 101 should move within the opening 31, it will be understood by those skilled in the art that there is a calculable relationship between the object and the pixels which are activated or de-activated.

In all instances, output from the pixels is converted by an opto-electric converter to electrical signals whereupon the electrical signal is compared with a predetermined signal for analysis. If the detected signal is not within predetermined tolerance limits of the predetermined signal, then a warning is produced. In a zone 1 situation, the photoelectric converter is located inside the cassette, but in a zone 0 situation, an arrangement such as that shown in FIG. 7 is adopted.

Referring to FIG. 7, where the apparatus is to be used in a zone 0 area, only optical components are allowed in the area. Thus, a power input cable 111 supplies power to a distribution board 112. The distribution board supplies power to illuminate LEDs 113 which project radiant energy via lens assemblies 114 over fibre optic cables 115 to light splitters 116. The elements 111–115 are located in a zone 1 area. The light splitters apply light via projection lenses 117 which, although shown in a line, would be disposed around the object, the profile of which is to be determined. Each projection lens 117 is associated with a respective receiving lens 118 disposed on an opposing side of the tube 1 from the projection lens 117. Thus, the receiving lenses 118 receive reduced light energy caused by the shadow of the tube 1. The receiving lenses 118 are connected via further fibre optic cables 119 to lens assemblies 120. The elements 116–118 are located in zone 0. The lens assemblies 120 direct energy to a respective opto-electric converter such as photo diodes 121 which then, via return wires 122, supply an energy output signal over cable 123. The elements in the zone 1 area are located in a control box 124 connected to an air pressure tube 125. The fibre optic cables 115, 119 linking the control box 124 with the housing 126 of the elements in the zone 0 area are protected by an armoured cable 127.

Figure 8:
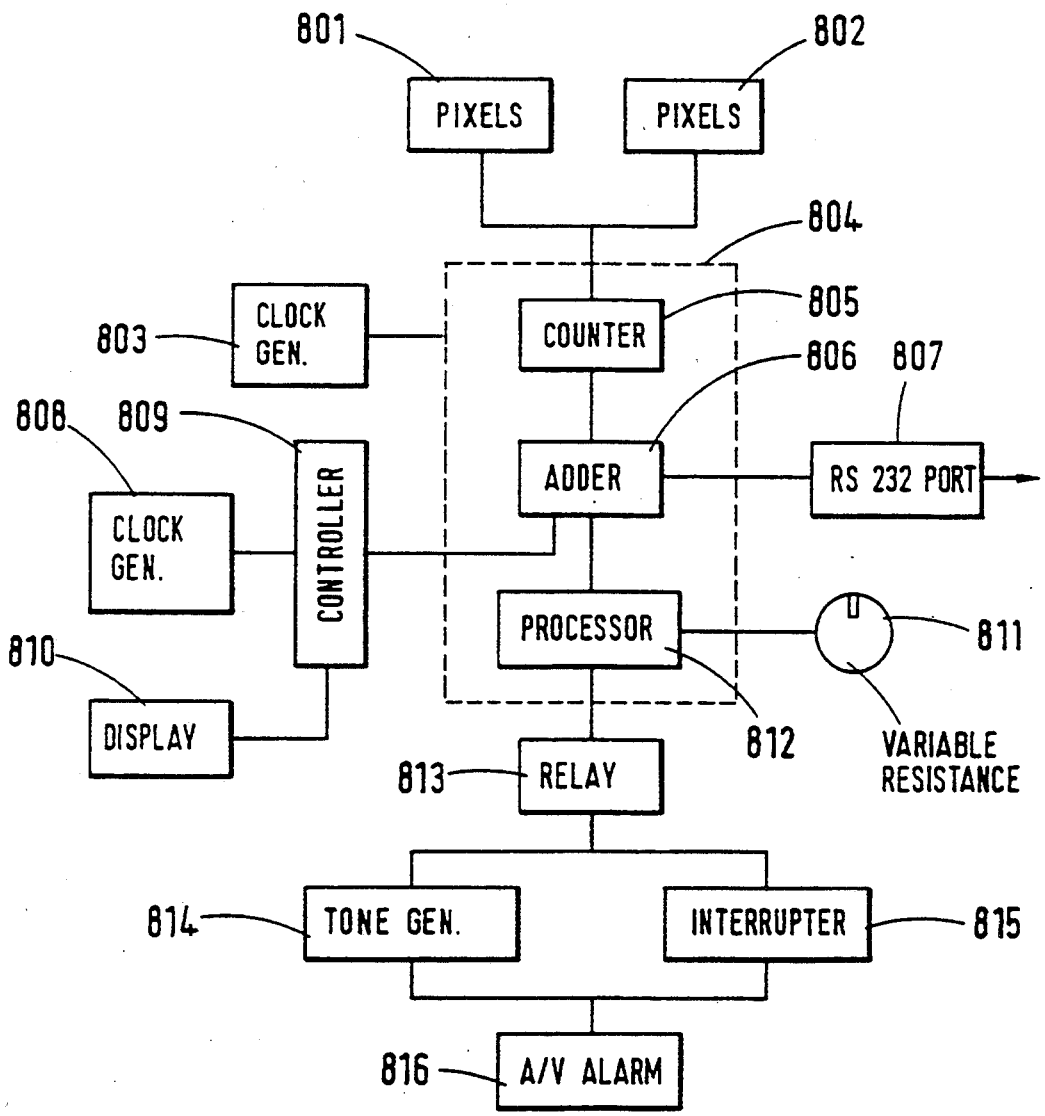
FIG. 8 shows in block schematic form a circuit diagram of the invention.

The elements of the apparatus necessary to provide various desired outputs, such as warning of deviation from selected dimensions or analogue or digital readouts providing sampling dimension or signals for input to a computer, data acquisition, graphics or other type of printer may take a variety of forms. The exemplified block schematic diagram of FIG. 8 shows only one combination of elements that will be apparent to those skilled in the art which may be used to extract dimensional data from the active or non-active count of picture elements in the light sensors. Picture element arrays 801, 802 are connected to provide electrical signals to a processor 804. Each of the picture elements 801, 802 is connected to a respective counter 805 and the outputs of the counters 805 are connected to an adder 806. The processor 804 has a clock generator 803. Because the processor 804 operates at 90,750 baud and it is required to reduce the baud rate so that the data may be displayed; thus a clock generator 808 is connected to drive a controller 809 so as to reduce the baud rate down to about 3 baud which provides a flicker-free display on a display 810. A variable resistance 811 is used to set the dimensional tolerance on an alarm and also sets the base diameter about which the tolerance is permitted. The variable resistance 811 is connected to a processing chip 812 and the chip 812 also receives an input from the adder 806. The processing chip 812 compares the received data from adder 806 with the dimensional data set by the variable resistance 811. The chip 812 provides accept/reject signals in dependence upon the result of the comparison, and if there is compatibility no warning is sounded, but if the signals received from the adder 806 are out of tolerance then a relay 813 is activated to drive a tone generator and an interrupter 815 is also activated, both the tone generator 814 and interrupter 815 being arranged to drive an audio/visual alarm unit 816.

The adder 806 may be connected to an output port, such as an RS232 port 807, for external drive to a computer or graphics terminal, for example. The variable resistance 811 is manually variable so that the base dimension and the tolerances may be altered, as desired.

I claim:

1. An apparatus for measuring the profile of a moving object comprising at least two spaced light emitting means and light receiving means for receiving illumination therefrom, the light emitting means being positioned on one side of a passage through which said object is movable and the light receiving means being positioned on another portion of said passage so that a particular profile of the object may be measured and the positioning of the light emitting means and light receiving means being such that the object partially cuts the light received by the light receiving means, processing means connected to the light receiving means for measuring the profile of said object from one of the illuminated portions of the light receiving means and the non-illuminated portion thereof, said light emitting means including light projecting means disposed at least partially around said passage and positioned to emit light beams along different angularly directed paths, said light receiving means also being disposed at least partially around said passage, said light projecting means and said light receiving means being located in a cassette housing said cassette housing having an aperture defining said passage, gas pressure means for increasing the internal pressure of said housing above atmospheric pressure, and a gas pressure detector provided for detecting said housing internal pressure and in dependence upon said housing internal pressure being adapted to cut off electrical power to said apparatus.

2. An apparatus as claimed in claim 1 wherein each light emitting means is a light emitting diode or laser diode and said light receiving means is a linear array of elements having a pitch of less than 0.00254 mm.

3. An apparatus as claimed in claim 1 wherein the processing means includes a comparator for comparing the measured profile with a predetermined set of profile values and for producing a signal representative of the difference therebetween.

4. An apparatus as claimed in claim 1 wherein the light output from the light emitting means is collimated by one of a lens and a line optic lens provided to produce parallel light rays.

5. An apparatus as claimed in claim 1 wherein the light emitting means include light source means and collimating means remotely positioned therefrom, a fibre optic cable linking said light source means and said collimating means so that only optical components are located in said housing, and an opto-electric converter is provided for providing signals to said processing means, which converter is located at a predetermined safe distance from the object.

6. An apparatus as claimed in claim 1 wherein the light emitting means, light detecting means and processing means are located on a printed circuit board in said housing.

7. An apparatus as claimed in claim 1 wherein an opening extends from a side wall of the housing to said aperture, said opening having sufficient width to permit said housing to locate about said object.

8. An apparatus as claimed in claim 1 wherein a plurality of housings are provided about said object, each housing being differently angularly positioned so that different profiles of said object may be measured.

9. An apparatus as claimed in claim 1 wherein manually resetable means are provided for setting a predetermined tolerance for the measured profile.

10. An apparatus as claimed in claim 9 wherein means, is provided for activating warning means if said predetermined tolerance is exceeded.

11. An apparatus as claimed in claim 10 wherein said warning means is one of at least an audible alarm and a visual alarm.

12. An apparatus for measuring the profile of a moving object comprising at least two spaced light emitting means and light receiving means for receiving illumination therefrom, the light emitting means being positioned on one side of a passage through which said object is movable and the light receiving means being positioned on another portion of said passage so that a particular profile of the object may be measured and the positioning of the light emitting means and light receiving means being such that the object partially cuts the light received by the light receiving means, processing means connected to the light receiving means for measuring the profile of said object from one of the illuminated portions of the light receiving means and the non-illuminated portion thereof, said light emitting means including light projecting means disposed at least partially around said passage and positioned to emit light beams along different angularly directed paths, said light receiving means also being disposed at least partially around said passage, said light projecting means and said light receiving means being located in a cassette housing, said cassette housing having an aperture defining said passage, and means for pressurizing said housing, wherein the processing means includes a comparator for comparing the measured profile with a predetermined set of profile values and for producing a signal representative of the difference therebetween.

13. An apparatus for measuring the profile of a moving object comprising at least two spaced light emitting means and light receiving means for receiving illumination therefrom, the light emitting means being positioned on one side of a passage through which said object is movable and the light receiving means being positioned on another portion of said passage so that a particular profile of the object may be measured and the positioning of the light emitting means and light receiving means being such that the object partially cuts the light received by the light receiving means, processing means connected to the light receiving means for measuring the profile of said object from one of the illuminated portions of the light receiving means and the non-illuminated portion thereof, said light emitting means including light projecting means disposed at least partially around said passage and positioned to emit light beams along different angularly directed paths, said light receiving means also being disposed at least partially around said passage, said light projecting means and said light receiving means being located in a cassette housing, said cassette housing having an aperture defining said passage, and means for pressurizing said housing, wherein the light emitting means include light source means and collimating means remotely positioned therefrom, a fibre optic cable linking said light source means and said collimating means so that only optical components are located in said housing, and an opto-electric converter is provided for providing signals to said processing means, which converter is located at a predetermined safe distance from the object.

14. An apparatus for measuring the profile of a moving object comprising at least two spaced light emitting means and light receiving means for receiving illumination therefrom, the light emitting means being positioned on one side of a passage through which said object is movable and the light receiving means being positioned on another portion of said passage so that a particular profile of the object may be measured and the positioning of the light emitting means and light receiving means being such that the object partially cuts the light received by the light receiving means, processing means connected to the light receiving means for measuring the profile of said object from one of the illuminated portions of the light receiving means and the non-illuminated portion thereof, said light emitting means including light projecting means disposed at least partially around said passage and positioned to emit light beams along different angularly directed paths, said light receiving means also being disposed at least partially around said passage, said light projecting means and said light receiving means being located in a cassette housing, said cassette housing having an aperture defining said passage, and means for pressurizing said housing, wherein a plurality of cassette housings are provided about said object, each cassette housing being differently angularly positioned so that different profiles of said object may be measured.

15. An apparatus for measuring the profile of a moving object comprising at least two spaced light emitting means and light receiving means for receiving illumination therefrom, the light emitting means being positioned on one side of a passage through which said object is movable and the light receiving means being positioned on another portion of said passage so that a particular profile of the object may be measured and the positioning of the light emitting means and light receiving means being such that the object partially cuts the light received by the light receiving means, processing means connected to the light receiving means for measuring the profile of said object from one of the illuminated portions of the light receiving means and the non-illuminated portion thereof, said light emitting means including light projecting means disposed at least partially around said passage and positioned to emit light beams along different angularly directed paths, said light receiving means also being disposed at least partially around said passage, said light projecting means and said light receiving means being located in a cassette housing, said cassette housing having an aperture defining said passage, means for pressurizing said housing, and manually resetable means for setting a predetermined tolerance for the measured profile.

* * * * *